(12) United States Patent
Marlin et al.

(10) Patent No.: US 7,405,173 B2
(45) Date of Patent: Jul. 29, 2008

(54) ALUMINA-TITANIUM OXIDE-ZIRCONIA FUSED GRAIN

(75) Inventors: Samuel Marlin, Plan d'Orgon (FR); Jerome Latournerie, Jouy le Montier (FR)

(73) Assignee: Saint-Gobain Centre de Recherches et d'Etudes Europeen, Courbevoie (FR)

( * ) Notice: Subject to any disclaimer, the term of this patent is extended or adjusted under 35 U.S.C. 154(b) by 0 days.

(21) Appl. No.: 11/700,118

(22) Filed: Jan. 31, 2007

(65) Prior Publication Data

US 2007/0197369 A1    Aug. 23, 2007

(30) Foreign Application Priority Data

Feb. 17, 2006  (FR) ................................. 06 01403

(51) Int. Cl.
  *C04B 35/48*  (2006.01)
  *C04B 35/49*  (2006.01)
  *C04B 35/00*  (2006.01)
  *C04B 35/484* (2006.01)
  *C04B 35/482* (2006.01)

(52) U.S. Cl. ...................... 501/105; 501/127; 501/134; 501/153

(58) Field of Classification Search ................. 501/105, 501/127, 134, 153
See application file for complete search history.

(56) References Cited

U.S. PATENT DOCUMENTS

| 3,993,119 A | 11/1976 | Scott |
| 4,758,542 A * | 7/1988 | Parker ........................ 501/134 |

FOREIGN PATENT DOCUMENTS

| EP | 1 149 060 B1 | 10/2001 |
| FR | 2 787 106 A1 | 6/2000 |
| JP | A-58-125660 | 7/1983 |
| JP | A-2003-245771 | 9/2003 |

\* cited by examiner

*Primary Examiner*—Jerry Lorengo
*Assistant Examiner*—Kevin M Johnson
(74) *Attorney, Agent, or Firm*—Oliff & Berridge, PLC

(57) ABSTRACT

An alumina-titanium oxide-zirconia fused grain presenting, for a total of 100%, the following chemical composition:
  $Al_2O_3$: more than 10% and less than 50%;
  $TiO_2$: more than 10% and less than 40%;
  $ZrO_2$: more than 50%; and
  impurities: less than 2%;
the percentages being percentages by weight on the basis of the oxides. The invention is applicable to slide gates for continuous casting of steel.

19 Claims, No Drawings

ALUMINA-TITANIUM OXIDE-ZIRCONIA FUSED GRAIN

The invention relates to alumina-titanium oxide-zirconia fused grains, to a method of manufacturing such grains, and to a slide gate including such grains.

BACKGROUND OF THE INVENTION

Slide gates are parts used in continuous casting of steel for opening and closing distributors or outlet orifices from casting ladles in fluid communication via a sliding nozzle with ingot molds. Slide gates must therefore present good mechanical strength, in particular against thermal shocks and spalling, and good chemical resistance, in particular against corrosion.

Conventionally, slide gates are obtained by sintering a mixture of alumina-zirconia fused grains and zirconia-mullite fused grains. The alumina-zirconia/zirconia-mullite composite is particularly good at withstanding thermal shocks because of its reinforcement by microcracking. During heating, the allotropic transformation of zirconia is accompanied by a large change in volume. This dimensional variation leads to the formation of microcracks. These microcracks also appear at the interfaces between zirconia-mullite particles and the alumina-zirconia matrix because of the large difference in thermal expansion between alumina-zirconia ($\alpha_{1000°C.}=9.6\times10^{-6}/°$ C.) and zirconia-mullite ($\alpha_{1000°C.}=6.9\times10^{-6}/°$ C.). These two phenomena lead to the part being microcracked, thereby increasing its capacity for absorbing energy in the event of thermal shocks.

Nevertheless, zirconia-mullite presents the disadvantage of presenting low resistance to corrosion, thus constituting the weak point of the composite.

OBJECT AND SUMMARY OF THE INVENTION

There thus exists a need for a novel grain suitable for taking the place of mullite-zirconia grain when manufacturing slide gates, that enables slide gates to be made that present improved resistance to corrosion. The object of the invention is to satisfy that need.

According to the invention, this object is achieved by means of an alumina-titanium oxide-zirconia fused grain presenting, for a total of 100%, the following chemical composition:

$Al_2O_3$: more than 10%, preferably more than 15%, and less than 50%, preferably less than 35%;

$TiO_2$: more than 10%, preferably more than 15%, and less than 40%, preferably less than 30%, more preferably less than 25%;

$ZrO_2$: more than 50%, and preferably less than 70%, or less than 61%;

impurities: less than 2%;

the percentages being percentages by weight based on the oxides, the grain not presenting a $TiO_2$ phase, and more than 98% by weight of the zirconia being monoclinic.

In a preferred embodiment of the invention, the composition of the grain comprises about 60% of $ZrO_2$, about 20% of $Al_2O_3$, and about 18% to 20% of $TiO_2$.

Surprisingly, the inventors have found that substituting mullite-zirconia grains with grains of the invention makes it possible to manufacture composite slide gates that withstand corrosion better, without degrading ability to withstand thermal shocks.

In addition, the inventors have found that the absence of the $TiO_2$ phase improves resistance to corrosion. The grain of the invention preferably presents the following phases only:

$Al_2O_3$ with $Zr_5Ti_7O_{24}$ and/or, ($ZrTiO_4$ or $ZrO_2$) with aluminum titanate $Al_2TiO_5$.

A preferred grain presents the phases $Al_2O_3-Zr_5Ti_7O_{24}$, the most preferred grain presenting the phases $ZrO_2-Al_2TiO_5$.

Finally, the grain of the invention can be melted by electrofusion, thus enabling large quantities of grains to be manufactured with advantageous efficiency. The price/performance ratio is thus excellent.

Preferably, the fused grain of the invention further includes one or more of the following optional characteristics:

its chemical composition further presents a quantity of tin oxide ($SnO_2$) of more than 2%, preferably more than 5%, and/or less than 10%, the ranges of the other ingredients not being changed. For a total of 100%, the chemical composition of the grain is then as follows, percentages being by weight based on the oxides:

$Al_2O_3$: more than 10%, preferably more than 15%, and less than 50%, preferably less than 35%, or less than 20%;

$TiO_2$: more than 10%, preferably more than 15%, and less than 40%, preferably less than 30%, more preferably less than 25%;

$ZrO_2$: more than 50%, and preferably less than 76%, or less than 70%;

$SnO_2$: more than 2%, preferably more than 5%, and less than 10%, or less than 6%;

impurities: less than 2%;

the zirconia may be combined with the tin oxide;

more than 98% of weight by the zirconia is in monoclinic phase.

Whatever the embodiment, the grain of the invention comprises preferably at least 0.1%, preferably at least 0.5% and/or less than 3% of MgO, in percentages by weight based on the oxides, the ranges of the other ingredients mentioned above not being changed.

For a total of 100%, chemical compositions of the grain are then as follows, percentages being by weight based on the oxides:

$Al_2O_3$: more than 10%, preferably more than 15%, and less than 50%, preferably less than 35%, or less than 20%;

$TiO_2$: more than 10%, preferably more than 15%, and less than 40%, preferably less than 30%, more preferably less than 25%;

$ZrO_2$: more than 50%, and preferably less than 76%, or less than 70%;

$SnO_2$: optional;

MgO: optional;

impurities: less than 2%;

When $SnO_2$ is present, its concentration is preferably more than 2%, preferably 5%, and/or less than 10%, or 6%.

When MgO is present, its concentration is preferably more than 0.1%, preferably 0.5%, and/or less than 3%, or 2.5%.

The "impurities" comprise ingredients other than $SnO_2$, $TiO_2$, $Al_2O_3$, $ZrO_2$, and, when explicitly mentioned MgO, and in particular compounds forming part of the group comprising oxides, nitrides, oxynitrides, carbides, oxycarbides, carbonitrides, and metallic species of sodium and other alkalies, irons, silicon, vanadium, and chromium. Hafnium oxide which is naturally present in sources of zirconia at concentrations of less than 2% is not considered as an impurity. Residual carbon, expressed as C, forms part of the impurities in the composition of grains of the invention.

It is considered that an impurity content of less than 2% does not eliminate the technical effect procured by the invention.

The invention also provides a method of fabricating alumina-titanium oxide-zirconia fused grains of the invention, the method comprising the following successive steps:

a) mixing raw materials to form an initial charge;

b) melting the initial charge to obtain a molten liquid;

c) cooling said molten liquid so that the molten liquid is entirely solidified in less than 3 minutes, preferably less than 1 minute, more preferably less than 15 seconds, so as to obtain a solid mass;

d) optionally grinding said solid mass so as to obtain a mixture of grains.

According to the invention, the raw materials are selected in step a) so that the grains obtained in step d) are in accordance with the invention.

Preferably, one or several of the oxides from $Al_2O_3$, $TiO_2$, $ZrO_2$, $SnO_2$, MgO, their precursors and their mixtures are intentionally, that is to say systematically and methodically, added in step a), in quantities guaranteeing that the grains obtained in step c) are in accordance with the invention.

Any conventional method of manufacturing alumina-titanium oxide-zirconia fused grains can be implemented, providing the composition of the initial charge enables grains to be obtained that presents a composition in accordance with that of grains of the invention.

In step a), the titanium may be introduced in any form, in particular in metallic form or in the form of a zirconia-titanium oxide alloy, or of alumina titanate.

Compositions enabling phases of $Zr_5Ti_7O_{24}$ and/or of alumina titanate $Al_2TiO_5$ and/or of $ZrTiO_4$ to be obtained while avoiding a $TiO_2$ phase can easily be determined by the person skilled in the art from the ternary $Al_2O_3$–$TiO_2$–$ZrO_2$ phase diagram, and more precisely along the pseudo-binary $Al_2TiO_5$–$ZrO_2$ diagram.

The contents of the various raw materials in the initial charge should also be determined to take account of the reduction in the content of $SnO_2$ during heating in step b). The magnitude of this reduction as a function of heating conditions is well known to the person skilled in the art.

In step b), it is preferable to use an electric arc furnace, however any known furnace could be envisaged, such as an induction furnace or a plasma furnace, providing it enables the initial charge to be melted completely. Heating is preferably performed under inert conditions, e.g. under argon, or under oxidizing conditions, preferably at atmospheric pressure.

In step c), cooling is rapid, i.e. so that the molten liquid solidifies completely in less than 3 minutes. Preferably, it is the result of casting into CS molds as described in U.S. Pat. No. 3,993,119 or from quenching. Advantageously, such rapid cooling avoids a $TiO_2$ phase appearing. Slow cooling would on the contrary lead to phases dissociating and thus produce the species: $Al_2O_3$+$TiO_2$ or $ZrO_2$+$TiO_2$.

In step d), the solid mass is ground, using conventional techniques.

Finally, the invention provides a slide gate made of sintered composite material presenting alumina-titanium oxide-zirconia fused grains of the invention bonded by an alumina-zirconia matrix.

DETAILED DESCRIPTION OF THE INVENTION

The following examples are provided by way of illustration and they do not limit the scope of the invention.

Reference 1 (ref. 1) is a $ZrO_2$-mullite product sold by the supplier Treibacher Schleifmittel.

Reference 2 (ref. 2) is a product known as FAZ 40. This product is an alumina-zirconia sold by the supplier Sowa Denko.

To prepare the samples of Examples 1, 2, and 3, powders were mixed in a Turbula mixer for 2 hours and then melted in a graphite crucible under an atmosphere of argon in an induction furnace. Cooling depends on the inertia of the furnace. That produced samples that were generally small, requiring post-melting oxidation heat treatment.

For the other examples and the reference compositions, the powder mixtures were melted using an electric arc furnace, under air, with oxidizing electrical operation. Cooling was controlled using various methods (CS mold enabling the sample to cool rapidly, ingot cooled in free air, or reheater unit).

The raw materials were as follows: CC10 monoclinic zirconia sold by SEPR, AR75 alumina from Pechiney, tin oxide from Keeling & Walker Ltd., $TiO_2$ rutile from CRB GmbH.

The chemical composition, given in percentages by weight based on the oxides were measured using conventional methods: chemical analysis was performed by X-ray fluorescence.

The crystal phases present in the refractory compositions were determined by X-ray diffraction. In Table 1, "~" means "traces".

The coefficient of expansion at 1000° C. "a" was measured on pellets prepared from powders having the same size fraction (median diameter d<150 micrometers (μm)), compacted at 20 kilonewtons (kN) over 13 millimeters (mm), and then sintered (1450° C. for 3 hours (h) in air).

Grain corrosion by slag was evaluated with an optical microscope after calcining a grain-slay mixture at 1450° C. The slag was essentially constituted by $SiO_2$ (40%), CaO (40%), $Na_2O$ (10%), and $Al_2O_3$ (5%). It presented a basicity index (CaO+MgO)/$SiO_2$ of 1. Although the grains were not intended to come into contact with slag, corrosion in slag serves to impose particularly severe conditions, making it possible to measure corrosion that is significant. A score "R" for resistance to corrosion was given in the range 0 to 4, with the resistance being better for higher R scores.

The allotropic transformation temperature "T" of the tested grains needs to be as close as possible to that of reference 2 (alumina-zirconia grains) so that microcracking is effective in improving the ability of the composite material made from a mixture of these two types of grain to absorb energy during thermal shocks, as explained in the introduction. In contrast, and for the same reason, the coefficient of expansion at 1000° C., "a" of a tested material should be as different as possible from that of reference 2.

"V" designates the rate of solidification of the molten liquid: "H" and "D" meaning "a few hours" and "a few days" respectively. "<10 s" means "less than 10 seconds".

The results are summarized in Table 1 below.

TABLE 1

| | V | Al$_2$O$_3$ | TiO$_2$ | MgO | ZrO$_2$ | SnO$_2$ | Phases | Phases after 10 h at 1100° C. | a | T | R |
|---|---|---|---|---|---|---|---|---|---|---|---|
| Réf 1 | | | | | | | | | 6.9·10$^{-6}$ °C.$^{-1}$ | 1050° C. | 1 |
| Réf 2 | | | | | | | | | 9.6·10$^{-6}$ °C.$^{-1}$ | 1100° C. | 0 |
| 3 | H | 40.4% | 31.0% | | 28.6% | | Zr$_5$Ti$_7$O$_{24}$, Al$_2$O$_3$, TiO$_2$ | | 5.4·10$^{-6}$ °C.$^{-1}$ | 500° C. | 1 |
| 4 | <10 s | 21.5% | 20.2% | | 58.3% | | mZrO$_2$, Al$_2$TiO$_5$ | mZrO$_2$, Al$_2$TiO$_5$, ~TiO$_2$ | 7.3·10$^{-6}$ °C.$^{-1}$ | 770° C. | 4 |
| 5 | H | 20.2% | 19.5% | | 60.3% | | mZrO$_2$, Al$_2$TiO$_5$, ~Zr$_5$Ti$_7$O$_{24}$ | mZrO$_2$, Al$_2$O$_3$, TiO$_2$, ~Al$_2$TiO$_5$ | 7.3·10$^{-6}$ °C.$^{-1}$ | 770° C. | 2 |
| 6 | D | 25.7% | 21.0% | | 53.3% | | mZrO$_2$, Al$_2$TiO$_5$, ~Al$_2$O$_3$, ~Al$_2$Ti$_7$O$_{15}$ | | | | 2 |
| 7 | <10 s | 19.6% | 15.9% | | 58.6% | 5.9% | mZrO$_2$, Al$_2$TiO$_5$, ~SnO$_2$ | | 8.2·10$^{-6}$ °C.$^{-1}$ | 960° C. | 3 |
| 8 | D | 18.8% | 14.5% | | 62.4% | 4.3% | mZrO$_2$, Al$_2$O$_3$, TiO$_2$, ~Al$_2$TiO$_5$, ~Zr$_{0.6}$Sn$_{0.4}$TiO$_4$ | | | | 2 |
| 9 | D | 12.4% | 10.0% | | 75.3% | 2.3% | mZrO$_2$, Al$_2$O$_3$, TiO$_2$, ~Al$_2$TiO$_5$, ~Zr$_{0.6}$Sn$_{0.4}$TiO$_4$ | | | | 2 |
| 10 | <10 s | 18.3% | 22.2% | 2.0% | 57.4% | | mZrO$_2$, solid solution AlTiMgO | mZrO$_2$, solid solution AlTiMgO | 4.9·10$^{-6}$ °C.$^{-1}$ | 842° C. | 4 |
| 11 | H | 18.1% | 22.0% | 2.0% | 57.9% | | mZrO$_2$, solid solution AlTiMgO | mZrO$_2$, solid solution AlTiMgO | 6·10$^{-6}$ °C.$^{-1}$ | 811° C. | 2 |

Table 1 above shows that the grains of the invention present coefficients of expansion "a" that are far enough removed from those of alumina-zirconia grains (reference 2) to generate microcracking in sintered composite materials made from those two types of grain. Grains of the invention can thus take the place of prior art mullite-zirconia grains for fabricating composite material slide gates, the alumina-titanium oxide-zirconia fused grains of the invention being bonded together by an alumina-zirconia matrix.

Table 1 also shows the advantage of rapid cooling (Examples 4 and 7), and also the drawback of the presence of a TiO$_2$ phase (Example 3), in improving resistance to corrosion.

Other measurements have also shown that grains of the invention present a coefficient of expansion that varies as a function of temperature in a manner that is similar to that of zirconia-mullite grains. In particular, the allotropic transformation of zirconia leads to a break in the variation of the coefficient of expansion. In order to ensure that this break takes place at a temperature that is as high as possible, advantageously substantially at the same temperature as for alumina-zirconia grains, it is preferable for the zirconia in the grains of the invention to be entirely in monoclinic form (more than 98%).

Since titanium is a stabilizer for zirconia, it is preferable for its content to be small in the initial charge. Preferably the TiO$_2$ content in the initial charge is thus less than 40%, preferably less than 30%, more preferably less than 25%.

As the examples 10 and 11 show, the presence of magnesia further improves the performances of the grains of the invention. Preferably, the grains of the invention comprise at least 0.1%, preferably at least 0.5% of MgO. The examples 10 and 11 show that a concentration close to 2%, in particular comprised between 1.5 and 2.5%, provides very good results.

In particular, a heat treatment during 10 h at 1100° C., representative of the heat conditions encountered in use, show that the phases, and therefore the properties of the grains, remain steady.

Besides, it is noteworthy that the presence of MgO, according to the invention, avoids the formation of TiO$_2$, which is harmful.

However, the concentration of MgO is preferably less than 3%, in percentages by weight based on the oxides. Beyond this limit, a part of the magnesia stabilizes the zirconia and the percentage of monoclinic zirconia may be less than 98%.

Examples 10 and 11 are regarded as the most preferable since they give an optimal compromise between the different properties.

In a preferred embodiment of the invention, the grains of the invention thus present the following concentrations by weight, in percentages by weight based on the oxides:

Al$_2$O$_3$: more than 16% and/or less than 20%;
TiO$_2$: more than 20% and/or less than 24%;
MgO: more than 1% and/or less than 3%;
ZrO$_2$: more than 55% and/or less than 60%;

Without being restricted to this theoretical explanation, the inventors consider that grains of the invention act in the same way as mullite-zirconia grains to microcrack the composite material, and thus make it better at withstanding thermal shocks.

Unlike zirconia-mullite grains, grains of the invention nevertheless do not lead to a silica-containing environment, which would lead to low resistance to corrosion. Using alumina-titanium oxide-zirconia grains of the invention instead of prior art mullite-zirconia grains thus serves to retain effective resistance to thermal shocks, while improving resistance to corrosion.

Naturally, the implements described are merely examples and they could be modified, in particular by substituting equivalent techniques, without thereby going beyond the ambit of the invention.

What is claimed is:

1. An alumina-titanium oxide-zirconia fused grain presenting the following chemical composition:

$Al_2O_3$: more than 10% and less than 50%;
$TiO_2$: more than 10% and less than 40%;
$ZrO_2$: more than 50%;
the percentages being percentages by weight on the basis of the oxides, the grain presenting no $TiO_2$ phase and more than 98% by weight of the zirconia being monoclinic.

2. A fused grain according to claim 1, in which the total of $Al_2O_3$, $TiO_2$, $ZrO_2$ and of the impurities represents 100%, the impurities representing less than 2%, the percentages being percentages by weight on the basis of the oxides.

3. A fused grain according to claim 1, in which the total of $Al_2O_3$, $TiO_2$, $ZrO_2$, MgO, $SnO_2$ and of the impurities represents 100%, the impurities representing less than 2%, MgO and $SnO_2$ being optional, the percentages being percentages by weight on the basis of the oxides.

4. A fused grain according to claim 3, in which:
MgO: 0 to 3%, and/or,
$SnO_2$: 0 to 10%.
in percentages by weight based on the oxides.

5. A alumina-titanium oxide-zirconia fused grain according to claim 4, in which:
$SnO_2$: more than 2%
in percentages by weight based on the oxides.

6. A fused grain according to claim 5, in which the concentration of tin oxide($SnO_2$) is more than 5%, in percentages by weight based on the oxides.

7. A fused grain according to claim 1, the chemical composition presenting the following concentrations:
$Al_2O_3$: more than 15% and/or less than 35%; and/or
$TiO_2$: more than 15% and/or less than 30%; and/or
$ZrO_2$: less than 70%;
the percentages being percentages by weight on the basis of the oxides.

8. A fused grain according claim 1, presenting a $TiO_2$ content of less than 25% by weight on the basis of the oxides.

9. A fused grain according to claim 1, having about 60% $ZrO_2$, about 20% $Al_2O_3$, and about 18% to 20% $TiO_2$.

10. A fused grain according to claim 1, presenting phases only of $Al_2O_3$ with $Zr_5Ti_7O_{24}$ and/or of $ZrTiO_4$ or $ZrO_2$ with alumina titanate $Al_2TiO_5$.

11. A fused grain according to claim 1, in which 100% of the zirconia is monoclinic.

12. A fused grain according to claim 3, in which:
MgO: more than 0.1%.
in percentage by weight based on the oxides.

13. A fused grain according to claim 12, comprising at least 0.5% of MgO, in percentage by weight based on the oxides.

14. A fused grain according to claim 3, presenting for a total of 100%, the following chemical composition, in percentages by weight based on the oxides:
$Al_2O_3$: more than 16% and/or less than 20%;
$TiO_2$: more than 20% and/or less than 24%;
MgO: more than 1% and/or less than 3%;
$ZrO_2$: more than 55% and/or less than 60%.

15. A fused grain according to claim 13, in which:
$SnO_2$: more than 2%.
in percentage by weight based on the oxides.

16. A slide gate made of a sintered composite material presenting alumina-titanium oxide-zirconia fused grains according to claim 1 bonded by an alumina-zirconia matrix.

17. A method of fabricating alumina-titanium oxide-zirconia fused grains, the method comprising the following successive steps:
 a) mixing raw materials to form an initial charge;
 b) melting the initial charge to obtain a molten liquid;
 c) cooling said molten liquid so that the molten liquid is entirely solidified in less than 3 minutes, so as to obtain a solid mass; and
 d) optionally grinding said solid mass so as to obtain a mixture of grains;
wherein in step a), the raw materials are selected in such a manner that the grains obtained in step d) are in accordance with claim 1.

18. A method according to claim 17 for manufacturing alumina-titanium oxide-zirconia fused grains in which, in step c), the molten liquid is entirely solidified in less than 1 minute.

19. A method according to claim 18 for manufacturing alumina-titanium oxide-zirconia fused grains in which, in step c), the molten liquid is entirely solidified in less than 15 seconds.

* * * * *